Jan. 17, 1928. 1,656,700
A. J. ERSTED
SUPPLEMENTAL DEVICE ATTACHMENT FOR FORDSON TRACTORS
Original Filed Oct. 20, 1923
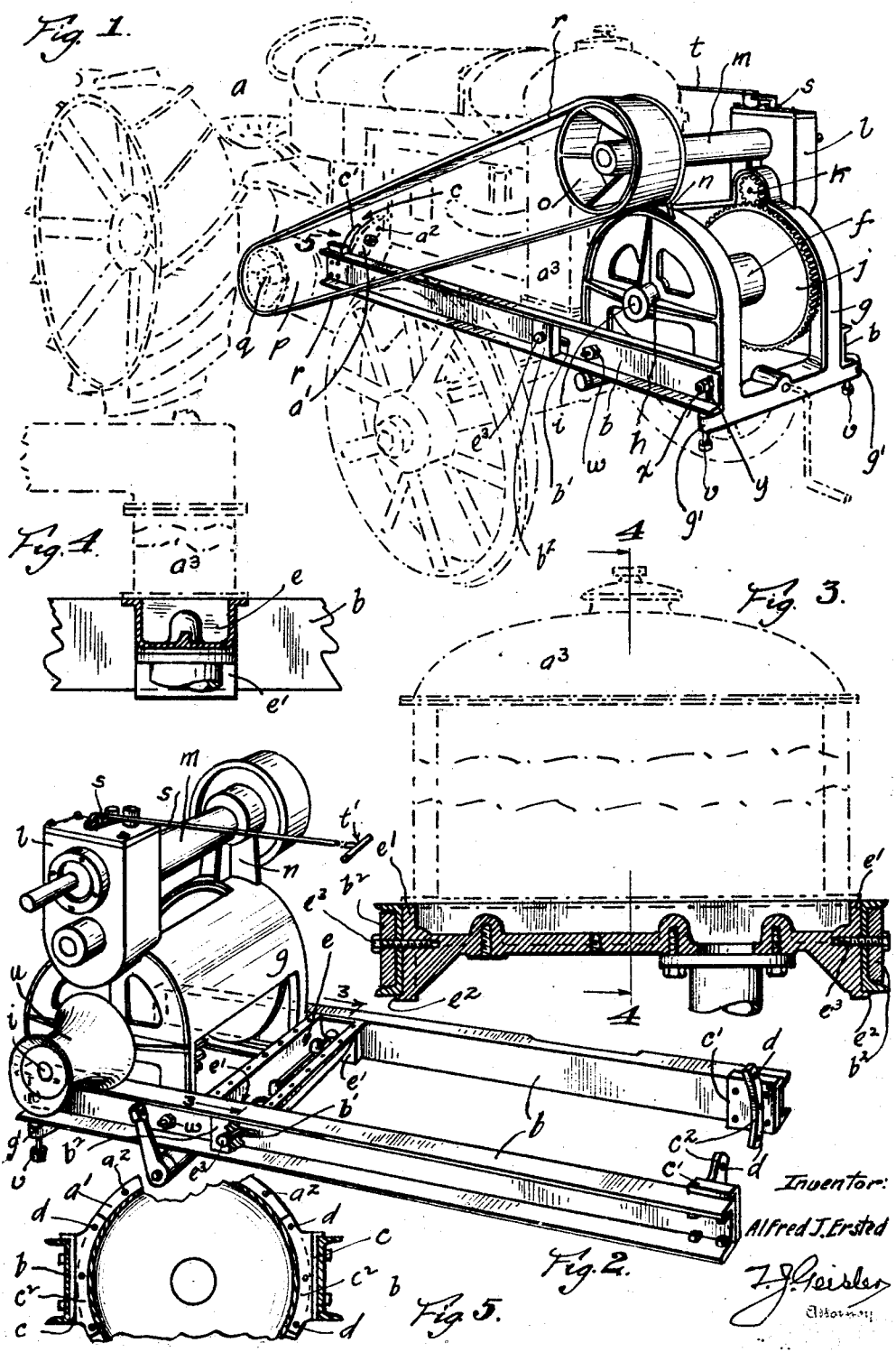
Inventor:
Alfred J. Ersted Patented Jan. 17, 1928.

1,656,700

UNITED STATES PATENT OFFICE.

ALFRED J. ERSTED, OF PORTLAND, OREGON.

SUPPLEMENTAL-DEVICE ATTACHMENT FOR FORDSON TRACTORS.

Application filed October 20, 1923, Serial No. 669,797. Renewed November 18, 1927.

My invention relates to attachments for mounting a supplemental operating device for instance a hoist, on a tractor of the Fordson type, so that the power of the tractor engine may be utilized to operate the supplemental device.

Heretofore supplemental operating devices were supported forward of the radiator of the Fordson by side frame members or sills fastened to and projecting from the body of the Fordson; but these sills were not secured in such a firm, substantial and rigid manner as to make the supplemental device substantially an integral part of the tractor; and since these operating supplemental attachments are of considerable weight, their mounting must be proportionately firm and strong, or they will not stand the racking due to operation. At the same time in order to provide a commercial working attachment, it is necessary to keep down its cost, and cost of installation; and to this end the attachment should not require the replacement of expensive parts of the tractor, nor change the construction or appearance of the latter.

A further object of my invention is so to construct and arrange the frame of my attachment that it may be readily and firmly affixed to the Fordson with only a minor change in the parts of the latter.

A still further object of my invention is, the means by which the side frame members of my attachment are affixed to the end portions of the radiator bottom-tank and the body of the tractor shall be adapted to permit said side frame-members longitudinal movement, so as to cause the pulling strain exerted on the frame-members to be imposed upon, and sustained by the body of the tractor.

A still further object of my invention is to mount the supplemental operating device carried by the frame of my attachment in such manner that the device may be given angular adjustment in a vertical plane, thereby to tighten the power transmitting belt or chain connecting said device with the engine of the tractor.

I attain my above specified objects, and incidental features, as follows:—

A substitute bottom tank is provided for the usual bottom-tank of the Fordson the substitute bottom tank being formed with end portions providing attaching faces of substantial area so as to be adapted to have the side frame member secured thereon. The side frame members of the attachment are fastened intermediate their ends to the end portions of said substitute bottom-tank; and means are provided by which said side frame-members are firmly connected at one end with the body of the tractor.

The said features of my invention are hereinafter more freely set forth in describing the details of my attachment, their arrangement and cooperation with each other and with the tractor all of which details are illustrated in the accompanying drawings.

In the latter, Fig. 1 is a perspective view showing my attachment as affixed to a Fordson, (the latter being shown in skeleton outline only) this figure illustrating the use of my attachment for supporting a hoist operated by the engine of the tractor;

Fig. 2 is a perspective view of my frame attachment by itself, but as seen from the opposite sides with respect to Fig. 1;

Fig. 3 is a section taken approximately on the line 3—3 of Fig. 2, thus showing in longitudinal section a suggested modification in the construction of the ends of the bottom-tank of the radiator of the tractor, so as to adapt them to have the frame-members of my attachment affixed thereto;

Fig. 4 is a section taken approximately on the line 4—4 of Fig. 3, and showing some details of construction; and Fig. 5 is a fragmentary view taken approximately as indicated by the arrow 5 in Fig. 1, and illustrates how the ends of the frame-members of my attachment may be firmly fastened to the flanges connecting the transmission housing with the cylinder block of the tractor.

As mentioned my attachment is primarily adapted for use with the Fordson tractor, which is shown by $a$. My attachment comprises a frame made up of two parallel longitudinal side frame members or sills $b$ consisting of channel bars, which are supported intermediate their ends by bolts $e^3$ threaded into suitable end portions $e'$ provided on the bottom-tank $e$ of the radiator of the tractor $a^3$ engine; and at one end of such frame its said sills $b$ have shoe like connections as $c$ with the body of the tractor. Such connections may consist of angle plates $c'$ (more clearly seen in Fig. 2) provided with perpendicular ribs $c^2$ on their backs, the edge faces of which are concaved so that they may be set against the transmission housing $a'$ of the tractor $a$. These perpendicular ribs $c^2$ are provided with holes $d$ to conform with the holes $a^2$ in the circumferential flange of the transmission housing $a'$, by which the latter is attached to the cylinder block. The bolts which hold these sections of the tractor together may thus be used to fasten the rear end of the supplemental frame in place. The concaved faces of said ribs $c^2$ lie closely about the cylindrical transmission housing, and thus tend to aid in the holding of the inner end of my frame attachment in place besides the bolts which pass through the holes $d$ of said perpendicular flanges and the holes $a^2$ of the circumferential flange of the transmission housing, for these concaved faces are substantially shoes which embrace the cylindrical transmission housing of the tractor and thus function to hold the rear end of the side sills $b$ securely in place against any motion other than rotation about the longitudinal axis of the transmission housing.

In order that the side frame members may be fastened to the bottom tank of the radiator of the tractor, I provide a special casting to be substituted in place of the usual bottom tank. The bottom tank substitute is preferably widened at its ends with the object of providing there flat attaching faces of substantial area for having the side frame members securely fastened thereto intermediate the ends of the latter. The lower edges of these end portions may be formed with flanges $e^2$ providing a support on which the side frame members may be seated. A block $b^2$ may be inserted between the flanges of the side frame members opposite the end-portions of the substitute radiator bottom tank, and the bolts $e^3$ inserted through said blocks.

The side sills $b$ are provided with slot like holes, as $b'$ for receiving the bolts $e^3$, fastening them to the said bearing spaces $e'$ of the radiator bottom tank. Thus any pulling strain exerted on the frame members $b$ is directly imposed upon the body of the tractor, through the medium of the devices connecting the inner end of the sills $b$ of the auxiliary frame to the flanges connecting the transmission housing with the cylinder block.

The frame of the supplemental device— for example a hoist—is pivotally supported by bolts $w$ on the outer ends of the sills $b$ of the auxiliary frame, so that said supplemental device may be given such angular adjustment as may be necessary to tighten the belt $r$, or its equivalent, used to transmit the power of the tractor engine to the supplemental device. The angular adjustment is effected by the set-screws V which are threaded into the laterally projecting frame ends $g'$ of the supplemental device, the set-screws V bearing against the lower flanges of the frame members $b$. As auxiliary securing means I provide bolts $x$ which bear in slots $y$ for the frame of the supplemental device.

Parts not specifically described are understood to be of conventional construction. The hoist consists of a drum $f$ mounted in U-shaped frame $g$, provided with bearings $h$ in which the shaft $i$ of the drum is journaled. The drum is provided with a driving gear $j$ on one flange which meshes with a driving pinion $k$ which extends into the casing $l$ enclosing the controlling mechanism. A driving shaft $m$ located above the drum $f$ is supported on one end by a bracket $n$ mounted upon the frame $g$, and on the other end by a bearing in the casing $l$. On one end of this shaft is a driving-pulley $o$, which is in alinement with the outboard pulley $p$ on the shaft $q$ of the tractor. The reversing operation is controlled by an arm $s$, which is connected to a rod $t$, which has a handle $t'$ within convenient reach of the operator of the tractor thus when moving the arm in one direction the hoist is rotated in one direction and by moving it in the opposite direction the drum is reversed. I preferably provide a gypsy drum $u$ on one end of the shaft $i$ for doing auxiliary work.

I claim:

1. A tractor provided with a radiator bottom having ends formed to provide broad vertical bearing faces with outstanding flanges at the lower ends, in combination with sills removably secured at their rear ends to a portion of the tractor, the intermediate portion of the sills resting upon said flanges and bearing against the broad faces of the radiator bottom, and means for securing the sills to such bearing faces.

2. The combination with a tractor, of side sills removably secured at their rear ends to the tractor, an intermediate member extending transverse the tractor and terminating in vertical bearing faces with lateral flanges at their lower ends, means for securing the sills on said flanges and in contact with said bearing faces, said intermediate member serving to connect and rigidly brace the sills intermediate their lengths, the intermediate member being formed between its bearing faces to form the bottom tank for the radiator of the tractor.

3. A tractor having the radiator thereof provided with a bottom wall, the respective ends of which are extended vertically above and below such wall to provide broad bearing faces, in combination with sills removably secured at their rear ends to a portion of the tractor, and means for removably securing said sills to the board bearing faces of the radiator bottom.

4. A tractor having the radiator thereof provided with a bottom wall, the respective ends of which are extended vertically above and below such wall to provide broad bearing faces, in combination with sills removably secured at their rear ends to a portion of the tractor, means for removably securing said sills to the broad bearing faces of the radiator bottom, and means supplemental to said securing means tending to relieve in part the shearing strain imposed by said sills on said securing means.

5. A tractor having the radiator thereof provided with a bottom section, the respective ends of which extend vertically relative to the plane of said bottom section, thereby to provide broad bearing-faces, in combination with sills secured at their rear ends to the tractor, and means rigidly securing the intermediate portions of said sills directly to the said broad bearing-faces of said bottom section.

ALFRED J. ERSTED.